(12) United States Patent
Li et al.

(10) Patent No.: US 7,091,409 B2
(45) Date of Patent: Aug. 15, 2006

(54) MUSIC FEATURE EXTRACTION USING WAVELET COEFFICIENT HISTOGRAMS

(75) Inventors: Tao Li, Rochester, NY (US); Qi Li, Newark, DE (US); Mitsunori Ogihara, Pittsford, NY (US)

(73) Assignee: University of Rochester, Rochester, NY (US)

( * ) Notice: Subject to any disclaimer, the term of this patent is extended or adjusted under 35 U.S.C. 154(b) by 71 days.

(21) Appl. No.: 10/777,222

(22) Filed: Feb. 13, 2004

(65) Prior Publication Data

US 2004/0231498 A1 Nov. 25, 2004

Related U.S. Application Data

(60) Provisional application No. 60/447,312, filed on Feb. 14, 2003.

(51) Int. Cl.
*G10H 7/00* (2006.01)
(52) U.S. Cl. .......................................... 84/634; 84/615
(58) Field of Classification Search .................. 84/615, 84/634
See application file for complete search history.

(56) References Cited

U.S. PATENT DOCUMENTS

| 5,124,930 | A | * | 6/1992 | Nicolas et al. .................. 702/76 |
| 5,781,881 | A | * | 7/1998 | Stegmann ..................... 704/211 |
| 6,105,015 | A | * | 8/2000 | Nguyen et al. ................ 706/26 |
| 6,718,063 | B1 | * | 4/2004 | Lennon et al. ............... 382/224 |
| 2001/0044719 | A1 | * | 11/2001 | Casey ........................ 704/245 |
| 2003/0086341 | A1 | * | 5/2003 | Wells et al. .............. 369/13.56 |
| 2003/0205124 | A1 | * | 11/2003 | Foote et al. ................... 84/608 |

OTHER PUBLICATIONS

T. Li, "Content-Based Music Similarity Search and Emotion Detection", Proceedings of the 2004 IEEE International Conference on Acoustics, Speech and Signal Processing (ICASSP 2004).
T. Li, et al., "A Comparative Study on Content-based Music Genre Classification" Proceedings of Annual ACM Conference and Research and Development in Information Retrieval, Jul.-Aug. 2003, p. 282-289.
G. Tzanetakis, "Musical Genre Classification of Audio Signals", IEEE Transaction on Speech and Audio Processing, vol. 10, No. 5, Jul. 2002, pp. 293-302.
M. Lennon, et al., "Curvilinear Component Analysis for Nonlinear Dimensionally Reduction of Hyperspectral Images", Univerersite de Rennes, France.
Joachim Stegmann, et al., "Robust Classification of Speech Based on the Dyadic Wavelet Transform with Application to CELP Coding", IEEE, 1996, pp. 546-549.
Vidya Venkatachalam, et al., "Automatic Identification of Sound Recordings", IEEE Signal Processing Magazine, Mar. 2004; pp. 92-99.

* cited by examiner

*Primary Examiner*—Rina Duda
*Assistant Examiner*—Christina Russell
(74) *Attorney, Agent, or Firm*—Blank Rome LLP

(57) ABSTRACT

A music classification technique computes histograms of Daubechies wavelet coefficients at various frequency subbands with various resolutions. The coefficients are then used as an input to a machine learning technique to identify the genre and emotional content of music.

26 Claims, 5 Drawing Sheets

MUSIC FEATURE EXTRACTION USING WAVELET COEFFICIENT HISTOGRAMS

REFERENCE TO RELATED APPLICATION

The present application claims the benefit of U.S. Provisional Patent Application No. 60/447,312, filed Feb. 14, 2003, whose disclosure is hereby incorporated by reference in its entirety into the present disclosure.

STATEMENT OF GOVERNMENT INTEREST

The work leading to the present invention was supported in part by NSF grants EIA-0080124, and DUE-9980943 and by NIH grants RO1-AG18231 (5-25589) and P30-AG18254. The government has certain rights in the invention.

FIELD OF THE INVENTION

The present invention is directed to the automated classification of music by genre and more particularly to such automated classification by use of a wavelet transform.

DESCRIPTION OF RELATED ART

Music is used not only for entertainment and for pleasure, but also for a wide range of purposes due to its social and physiological effects. At the beginning of the 21st century, the world is facing ever-increasing growth of on-line music information, empowered by the permeation of the Internet into daily life. Efficient and accurate automatic music information processing (accessing and retrieval, in particular) will be an extremely important issue, and it has been enjoying a growing amount of attention.

Music can be classified based on its style and the styles have a hierarchical structure. A currently popular topic in automatic music information retrieval is the problem of organizing, categorizing, and describing music contents on the web. Such endeavor can be found in on-line music databases such as mp3.com and Napster. One important aspect of the genre structures in these on-line databases is that the genre is specified by human experts as well as amateurs (such as the user) and that the labeling process is time-consuming and expensive.

Currently, music genre classification is done mainly by hand because giving a precise definition of a music genre is extremely difficult and, in addition, many music sounds sit on boundaries between genres. These difficulties are due to the fact that music is an art that evolves, where performers and composers have been influenced by music in other genres.

However, it has been observed that audio signals (digital or analog) of music belonging to the same genre share certain characteristics, because they are composed of similar types of instruments, having similar rhythmic patterns, and similar pitch distributions [7] (numbers in brackets refer to publications listed at the end of this section). This suggests the feasibility of automatic musical genre classification. Automatic music genre classification is a fundamental component of music information retrieval systems. The process of genre categorization in music is divided into two steps: feature extraction and multi-class classification. In the feature extraction step, information is extracted from the music signals representing the music. The features extract should be comprehensive (representing the music very well), compact (requiring a small amount of storage), and effective (not requiring much computation for extraction). To meet the first requirement the design has to be made so that the both low-level and high-level information of the music is included. In the second step, a mechanism (an algorithm and/or a mathematical model) is built for identifying the labels from the representation of the music sounds with respect to their features.

There has been a considerable amount of work in extracting features for speech recognition and music-speech discrimination, but much less work has been reported on the development of descriptive features specifically for music signals. Currently the most influential approach to direct modeling of music signals for automatic genre classification is due to Tsanetakis and Cook [29], where the timbral texture, rhythm, and pitch content features are explicitly developed. The accuracy of classification based on these features, however, is only 61% is achieved on their ten-genre sound dataset. This raises the question of whether there are different features that are more useful in music classification and whether the use of statistical or machine learning techniques (e.g. discriminant analysis and support vector machines) can improve the accuracy.

Many different features can be used for music classification, e.g. reference features including title and composer, content-based acoustic features including tonality, pitch, tempo, and beat, symbolic features extracted from the scores, and text-based features extracted from the song lyrics. The content-based acoustic features are classified into timbral texture features, rhythmic content features, and pitch content features [29]. Timbral features are mostly originated from traditional speech recognition techniques. They are usually calculated for every short-time frame of sound based on the Short Time Fourier Transform (STFT) [22]. Typical timbral features include Spectral Centroid, Spectral Rolloff, Spectral Flux, Energy, Zero Crossings, Linear Prediction Coefficients, and Mel-Frequency Cepstral Coefficients (MFCCs) (see [22] for more detail). Among these timbral features, MFCCs have been dominantly used in speech recognition. Logan [18] examines MFCCs for music modeling and music/speech discrimination. Rhythmic content features contains information about the regularity of the rhythm, the beat and tempo information. Tempo and beat tracking from acoustic musical signals has been explored in [13, 15, 24]. Foote and Uchihashi [10] use the beat spectrum to represent rhythm. Pitch content features deals with the frequency information of the music bands and are obtained using various pitch detection techniques.

Much less work has been reported on music genre classification. Tzanetakis and Cook [29] proposes a comprehensive set of features for direct modeling of music signals and explores the use of those features for musical genre classification using K-Nearest Neighbors and Gaussian Mixture models. Lambrou et al. [14] uses statistical features in the temporal domain as well as three different wavelet transform domains to classify music into rock, piano and jazz. Deshpande et al. [5] uses Gaussian Mixtures, Support Vector Machines and Nearest Neighbors to classify the music into rock, piano, and jazz based on timbral features. The problem of discriminate music and speech has been investigated by Saunders [23], Scheier and Slaney [25]. Zhang and Kuo [32] propose a heuristic rule-based system to segment and classify audio signals from movies or TV programs. In [31] audio contents are divided into instrument sounds, speech sounds, and environment sounds using automatically extracted features. Foote [9] constructs a learning tree vector quantizer using twelve MFCCs plus energy as audio features for retrieval. Li and Khokhar [16] propose nearest feature line methods for content based classification audio retrieval. Pye [21] investigates the use of Gaussian Mixture Modeling (GMM) and Tree-Based Vector Quantization in music genre classification. Soltau et al. [26] propose an approach of representing temporal structures of input signal. They show that this new set of abstract features can be learned via artificial neural networks and can be used for music genre identification.

The four types of content features mentioned above will now be described in detail.

Timbral textual features are used to differentiate mixtures of sounds that are possibly with the same or similar rhythmic and pitch contents. The use of these features originates from speech recognition. To extract timbral features, the sound signals are first divided into frames that are statistically stationary, usually by applying a windowing function at fixed intervals. The window function, typically a Hamming window, removes edge effects. Timbral textual features are then computed for each frame and the statistical values (such as the mean and the variance) of those features are calculated.

Mel-Frequency Cesptral Coefficients (MFCCs) are designed to capture short-term spectral-based features. After taking the logarithm of the amplitude spectrum based on STFT for each frame, the frequency bins are grouped and smoothed according to Mel-frequency scaling, which is designed to agree with perception. MFCCs are generated by decorrelating the Mel-spectral vectors using discrete cosine transform.

Spectral Centroid is the centroid of the magnitude spectrum of STFT and is a measure of spectral brightness.

Spectral Rolloff is the frequency below which 85% of the magnitude distribution is concentrated. It measures the spectral shape.

Spectral Flux is the squared difference between the normalized magnitudes of successive spectral distributions. It measures the amount of local spectral change.

Zero Crossings is the number of time domain zero crossings of the signal. It measures noisiness of the signal.

Low Energy is the percentage of frames that have energy less than the average energy over the whole signal. It measures amplitude distribution of the signal.

Rhythmic content features characterize the movement of music signals over time and contain such information as the regularity of the rhythm, the beat, the tempo, and the time signature. The feature set for representing the rhythm structure is based on detecting the most salient periodicities of the signal and it is usually extracted from beat histogram. To construct the beat histogram, the time domain amplitude envelope of each band is first extracted by decomposing the music signal into a number of octave frequency bands. Then, the envelopes of each band are summed together followed by the computation of the autocorrelation of the resulting sum envelope. The dominant peaks of the autocorrelation function, corresponding to the various periodicities of the signal's envelope, are accumulated over the whole sound file into a beat histogram where each bin corresponds to the peak lag. The rhythmic content features are then extracted from the beat histogram, and generally they contain relative amplitude of the first and second histogram peaks, the ratio of the amplitude of the second peak divided by the amplitude of the first peak, the periods of the first and second peaks, and the overall sum of the histogram.

The pitch content features describe the melody and harmony information about music signals and are extracted based on various pitch detection techniques. Basically, the dominant peaks of the autocorrelation function, calculated via the summation of envelopes for each frequency band obtained by decomposing the signal, are accumulated into pitch histograms, and the pitch content features are then extracted from the pitch histograms. The pitch content features typically include: the amplitudes and periods of maximum peaks in the histogram, the pitch intervals between the two most prominent peaks, and the overall sums of the histograms.

It is not difficult to see that the traditional feature extraction described above more or less capture incomplete information of music signals. Timbral textual features are standard features used in speech recognition and are calculated for every short-time frame of sound while rhythmic and pitch content features are computed over the whole file. In other words, timbral features capture the statistics of local information of music signals from a global perspective, but do not adequately represent the global information of the music. Moreover, as indicated by our experiments to be described below, the rhythm and pitch content features do not seem to capture enough information content for classification purposes.

Prior art related to music classification includes the following:

[1] E. L. Allwein, R. E. Schapire, and Y. Singer. Reducing multiclass to binary: A unifying approach for margin classifiers. In *Proc. 17th International Conf. on Machine Learning*, pages 9–16. Morgan Kaufmann, San Francisco, Calif., 2000.

[2] C.-C. Chang and C.-J. Lin. LIBSVM: a library for support vector machines, 2001. Software available at http://www.csie.ntu.edu.tw/~cjlin/libsvm.

[3] I. Daubechies. Ten lectures on wavelets. *SIAM*, Philadelphia, 1992.

[4] A. David and S. Panchanathan. Wavelet-histogram method for face recognition. *Journal of Electronic Imaging*, 9(2):217–225, 2000.

[5] H. Deshpande, R. Singh, and U. Nam. Classification of music signals in the visual domain. In *Proceedings of the COST-G6 Conference on Digital Audio Effects*, 2001.

[6] T. G. Dietterich and G. Bakiri. Solving multiclass learning problems via error-correcting output codes. Journal of Artificial Intelligence Research, 2:263–286,1995.

[7] W. J. Dowling and D. L. Harwood. *Music Cognition*. Academic Press, Inc, 1986.

[8] P. Flandrin. Wavelet analysis and synthesis of fractional Brownian motion. *IEEE Transactions on Information Theory*, 38(2):910–917, 1992.

[9] J. Foote. Content-based retrieval of music and audio. In *Multimedia Storage and Archiving Systems II, Proceedings of SPIE*, pages 138–147, 1997.

[10] J. Foote and S. Uchihashi. The beat spectrum: a new approach to rhythm analysis. In *IEEE International Conference on Multimedia & Expo* 2001, 2001.

[11] K. Fukunaga. *Introduction to statistical pattern recognition*. Academic Press, New York, 2nd edition, 1990.

[12] G. Fung and O. L. Mangasarian. Multicategory proximal support vector machine classifiers. Technical Report 01–6, University of Wisconsin at Madison, 2001.

[13] M. Goto and Y. Muraoka. A beat tracking system for acoustic signals of music. In *ACM Multimedia*, pages 365–372, 1994.

[14] T. Lambrou, P. Kudumakis, R. Speller, M. Sandler, and A. Linney. Classification of audio signals using statistical features on time and wavelet transform domains. In *Proc. Int. Conf. Acoustic, Speech, and Signal Processing* (ICASSP-98), volume 6, pages 3621–3624, 1998.

[15] J. Laroche. Estimating tempo, swing and beat locations in audio recordings. In *Workshop on Applications of Signal Processing to Audio and Acoustics* (WASPAA01), 2001.

[16] G. Li and A. A. Khokhar. Content-based indexing and retrieval of audio data using wavelets. In *IEEE International Conference on Multimedia and Expo (II)*, pages 885–888, 2000.

[17] T. Li, Q. Li, S. Zhu, and M. Ogihara. A survey on wavelet applications in data mining. *SIGKDD Explorations*, 4(2):49–68, 2003.

[18] B. Logan. Mel frequency cepstral coefficients for music modeling. In *Proc. Int. Symposium on Music Information Retrieval ISMIR*, 2000.

[19] T. M. Mitchell. *Machine Learning*. The McGraw-Hill Companies, Inc., 1997.

[20] D. Perrot and R. R. Gjerdigen. Scanning the dial: an exploration of factors in the identification of musical style. In *Proceedings of the 1999 Society for Music Perception and Cognition*, page 88, 1999.

[21] D. Pye. Content-based methods for managing electronic music. In *Proceedings of the 2000 IEEE International Conference on Acoustic Speech and Signal Processing*, 2000.

[22] L. Rabiner and B. Juang. *Fundamentals of Specch Recognition*. Prentice-Hall, N.J., 1993.

[23] J. Saunders. Real-time discrimination of broadcast speech/music. In *Proc. ICASSP 96*, pages 993–996, 1996.

[24] E. Scheirer. Tempo and beat analysis of acoustic musical signals. *Journal of the Acoustical Society of America*, 103(1), 1998.

[25] E. Scheirer and M. Slaney. Construction and evaluation of a robust multifeature speech/music discriminator. In *Proc. ICASSP '97*, pages 1331–1334, Munich, Germany, 1997.

[26] H. Soltau, T. Schultz, and M. Westphal. Recognition of music types. In *Proceedings of the 1998 IEEE International Conference on Acoustics, Speech and Signal Processing*, 1998.

[27] M. Swain and D. Ballard. Color indexing. *Int. J. computer vision*, 7:11–32, 1991.

[28] G. Tzanetakis and P. Cook. Marsyas: A framework for audio analysis. *Organized Sound*, 4(3):169–175, 2000.

[29] G. Tzanetakis and P. Cook. Musical genre classification of audio signals. *IEEE Transactions on Speech and Audio Processing*, 10(5), July 2002.

[30] V. N. Vapnik. *Statistical Learning Theory*. Wiley, New York, 1998.

[31] E. Wold, T. Blum, D. Keislar, and J. Wheaton. Content-based classification, search and retrieval of audio. *IEEE Multimedia*, 3(2):27–36, 1996.

[32] T. Zhang and C.-C. J. Kuo. Audio content analysis for online audiovisual data segmentation and classification. *IEEE Transactions on Speech and Audio Processing*, 3(4), 2001.

SUMMARY OF THE INVENTION

It will be readily apparent from the above that a need exists in the art to address the above concerns. To achieve the above and other objects, the present invention is directed to a feature extraction technique for music genre classification based on a wavelet histogram to capture local and information of music signals simultaneously.

The wavelet transform is a synthesis of ideas emerging over many years from different fields such as mathematics and image and signal processing and has been widely used in information retrieval and data mining. A complete survey on wavelet application in data mining can be found in [17]. Generally speaking, the wavelet transform, providing good time and frequency resolution, is a tool that divides up data, functions, or operators into different frequency components and then studies each component with a resolution matched to its scale [3]. Straightforwardly, a wavelet coefficients histogram is the histogram of the (rounded) wavelet coefficients obtained by convolving a wavelet filter with an input music signal (details on histogram and wavelet filter/analysis can be found in [27, 3] respectively).

Several favorable properties of wavelets, such as compact support, vanishing moments and decorrelated coefficients, make them useful tools for signal representation and transformation. Generally speaking, wavelets are designed to give good time resolution at high frequencies and good frequency resolution at low frequencies. Compact support guarantees the localization of wavelets, vanishing moment property allows wavelet focusing on the most important information and the discarding of noisy signals, and decorrelated coefficients property enables the wavelet to reduce temporal correlation so that the correlation of wavelet coefficients is much smaller than that of the corresponding temporal process [8]. Hence, after the wavelet transform, the complex signal in the time domain can be reduced into a much simpler process in the wavelet domain. Computing the histograms of wavelet coefficients allows a good estimation of the probability distribution over time. The good probability estimation thus leads to a good feature representation.

A preferred embodiment, called DWCHs (Daubechies wavelet coefficient histograms) to be disclosed below, capture the local and global information of music signals simultaneously by computing histograms on their Daubechies wavelet coefficients. The effectiveness of this new feature and of previously studied features are compared using various machine learning classification algorithms, including Support Vector Machines and Linear Discriminant Analysis. It is demonstrated that the use of DWCHs significantly improves the accuracy of music genre classification. As will be explained below, wavelet techniques other than Daubechies wavelet coefficients can be used as an alternative.

DWCHs represent music signals by computing histograms on Daubechies wavelet coefficients at various frequency bands at different resolutions, and it has significantly improved the accuracy of music genre classification.

The following publications of the inventors are hereby incorporated by reference in their entireties into the present disclosure:

"A Comparative Study of Content-Based Music Genre Classification", by Tao Li, Mitsunori Ogihara, and Qi Li, *Proceedings of Annual ACM Conference on Research and Development in Information Retrieval*, Jul. 28–Aug. 1, 2003 (SIGIR 2003), Pages 282–289.

"Content-Based Music Similarity Search and Emotion Detection", by Tao Li and Mitsunori Ogihara, to appear in *Proceedings of The 2004 IEEE International Conference on Acoustics, Speech, and Signal Processing (ICASSP 2004)*.

"Detecting Emotion in Music" by Tao Li and Mitsunori Ogihara, *Proceedings of the fourth international conference on music information retrieval (ISMIR 2003)*.

BRIEF DESCRIPTION OF THE DRAWINGS

A preferred embodiment of the present invention will be disclosed in detail below with reference to the drawings, in which.

DETAILED DESCRIPTION OF THE PREFERRED EMBODIMENT

Figure 1:
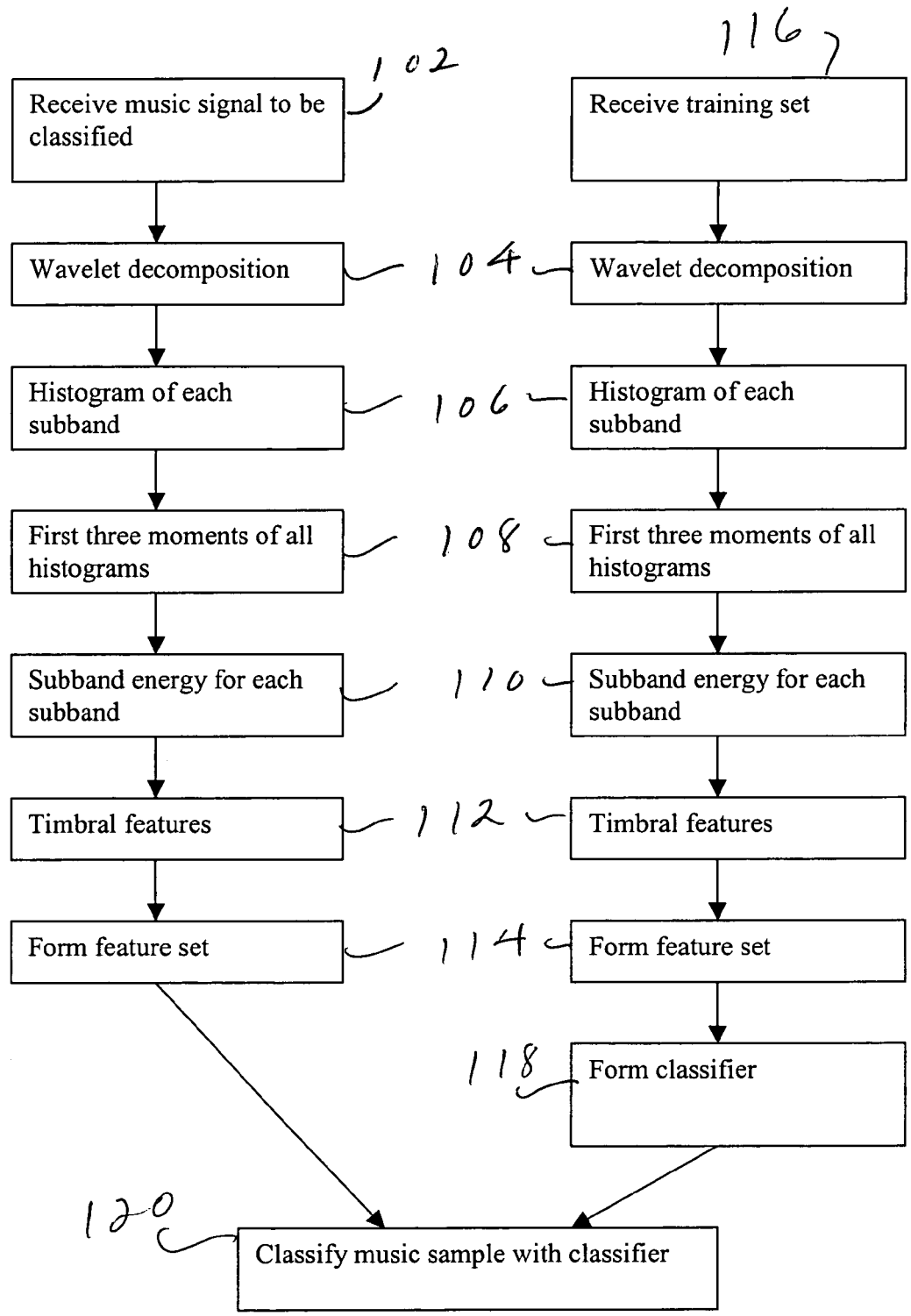
FIG. 1 is a flow chart showing the operations of the preferred embodiment.

A preferred embodiment of the present invention and variations thereon will be set forth in detail with reference to the drawings, in which like reference numerals refer to like elements or steps throughout.

A sound file is a kind of oscillation waveform in the time domain and can be considered as a two-dimensional entity of the amplitude over time, in the form of $M(t)=D(A, t)$, where A is the amplitude and generally ranges from $[-1, 1]$. The distinguishing characteristics are contained in the amplitude variation, and in consequence, identifying the amplitude variation would be essential for music categorization.

On one hand, the histogram technique is an efficient technique for the distribution estimation. However, the raw signal in time domain is not a good representation, particularly for content-based categorization, since the most distinguished characteristics are hidden in frequency domain. On the other hand, the sound frequency spectrum is generally divided into octaves, with each having a unique quality. An octave is the interval between any frequencies that have a tonal ratio of 2 to 1, a logarithmic-relation in frequency band. The wavelet decomposition scheme matches the models of sound octave division for perceptual scales and provides good time and frequency resolution [16]. In other words, the decomposition of an audio signal using wavelets produces a set of subband signals at different frequencies corresponding to different characteristics. This motivates the use of wavelet histogram techniques for feature extraction. The wavelet coefficients are distributed in various frequency bands at different resolutions.

The process according to the preferred embodiment will be explained with reference to the flow chart of FIG. 1. In step 102, a file or other electronic signal representing the piece of music to be classified is received. The file or other electronic signal can be retrieved from persistent storage, either locally or remotely, e.g., over the Internet. Alternatively, it can be received from a non-persistent source, e.g., in real time.

The signal is subjected to a wavelet decomposition in step 104. There are many kinds of wavelet filters, including Daubechies wavelet filters and Gabor filters. Daubechies wavelet filters are the one commonly in image retrieval (more details on wavelet filters can be found in [3]). The preferred embodiment uses Daubechies wavelet filter Db8 with seven levels of decomposition.

After the decomposition, the histogram of the wavelet coefficients is constructed at each subband in step 106. The coefficient histogram provides a good approximation of the waveform variations at each subband. From probability theory, a probability distribution is uniquely characterized by its moments. Hence, if the waveform distribution is interpreted as a probability distribution, then it can be characterized by its moments. To characterize the waveform distribution, the first three moments of a histogram are used [4]. The first three moments are the average, the variance and the skewness of each subband and are calculated in step 108. In addition, the subband energy, defined as the mean of the absolute value of coefficients, is computed for each subband in step 110. In addition, the final DWCHs feature set also includes the traditional timbral features for speech recognition, which are determined in step 112. The final feature set is formed from the above information in step 114.

Each music file in the datasets used in the experiments is 30-second signal that will be first converted to an extremely long vector. Based on an intuition of "self-similarity" of a piece of music, i.e., its repeated theme, the DWCHs feature can be extracted on a small slice of an input music signal, and in the experiments, sound clips of three seconds in duration are used. In summary, the algorithm of DWCHs extraction contains the following steps:

1. The wavelet decomposition of the music signals is obtained (step 104).
2. Histogram of each subband is constructed (step 106).
3. Compute the first three moments of all histograms (step 108).
4. Compute the subband energy for each subband (step 110).

The algorithm is very easy to implement in Matlab, which contains a complete wavelet package.

Figure 2:
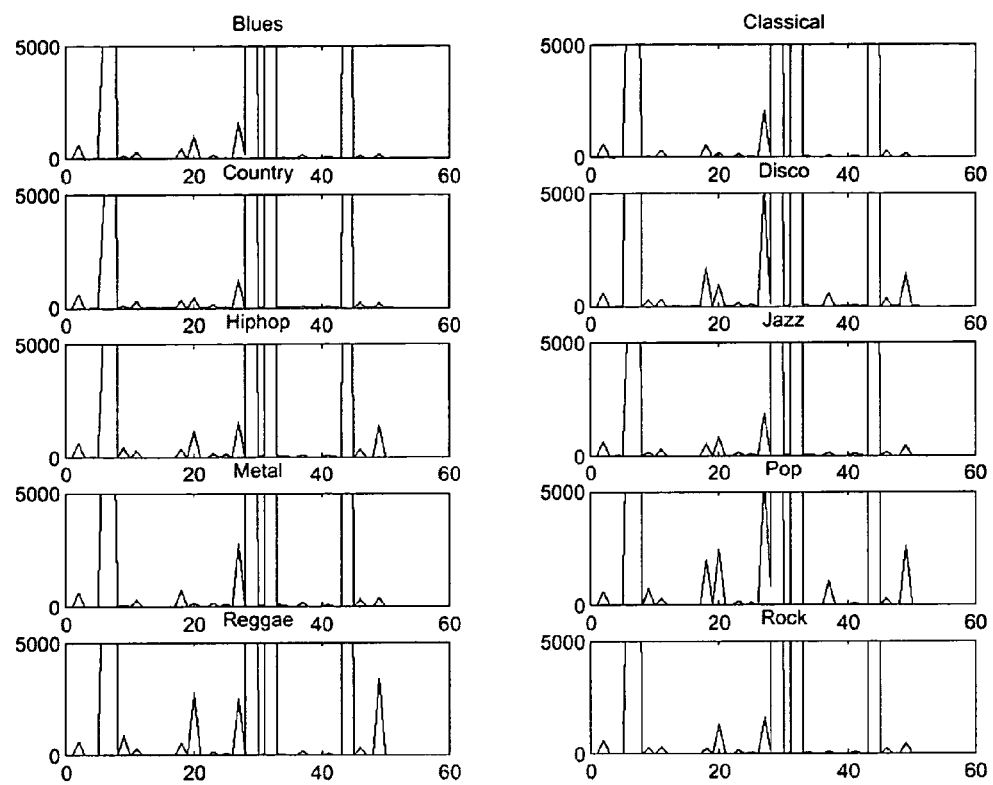
FIG. 2 is a plot of the feature sets of ten different categories of music.
Figure 3:
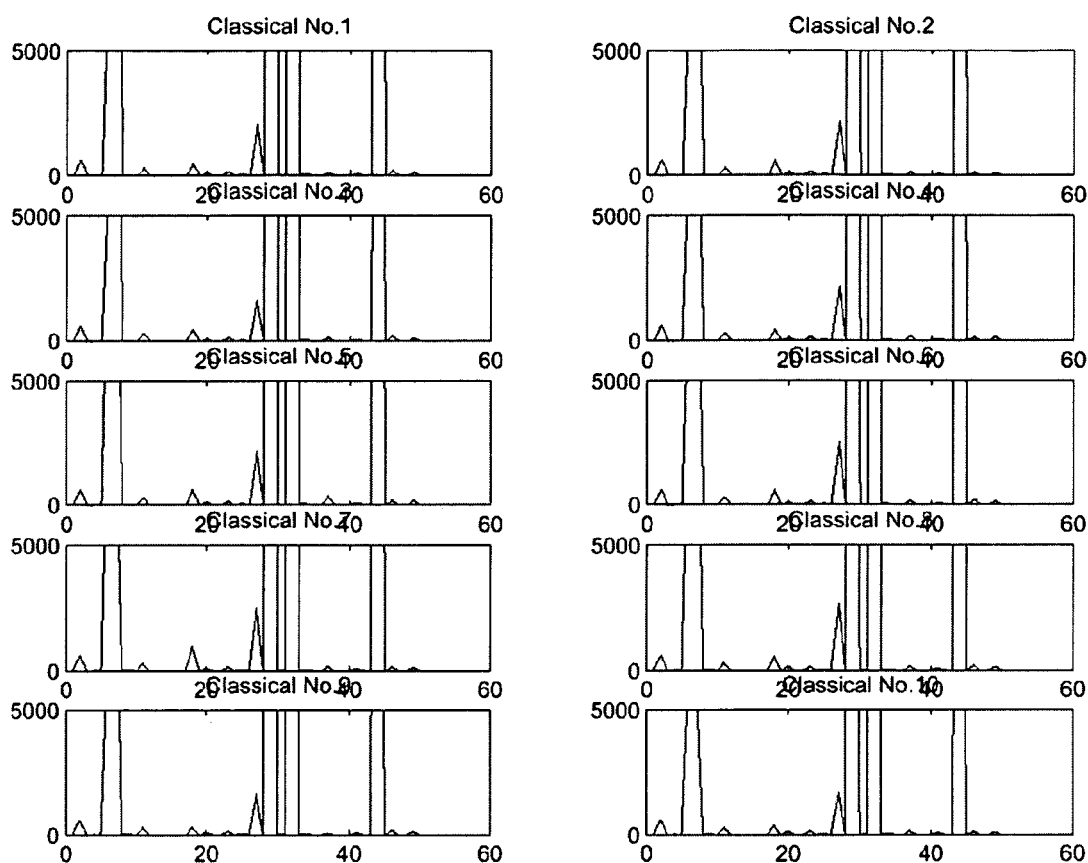
FIG. 3 is a plot of the feature sets of ten pieces of classical music.
Figure 4:
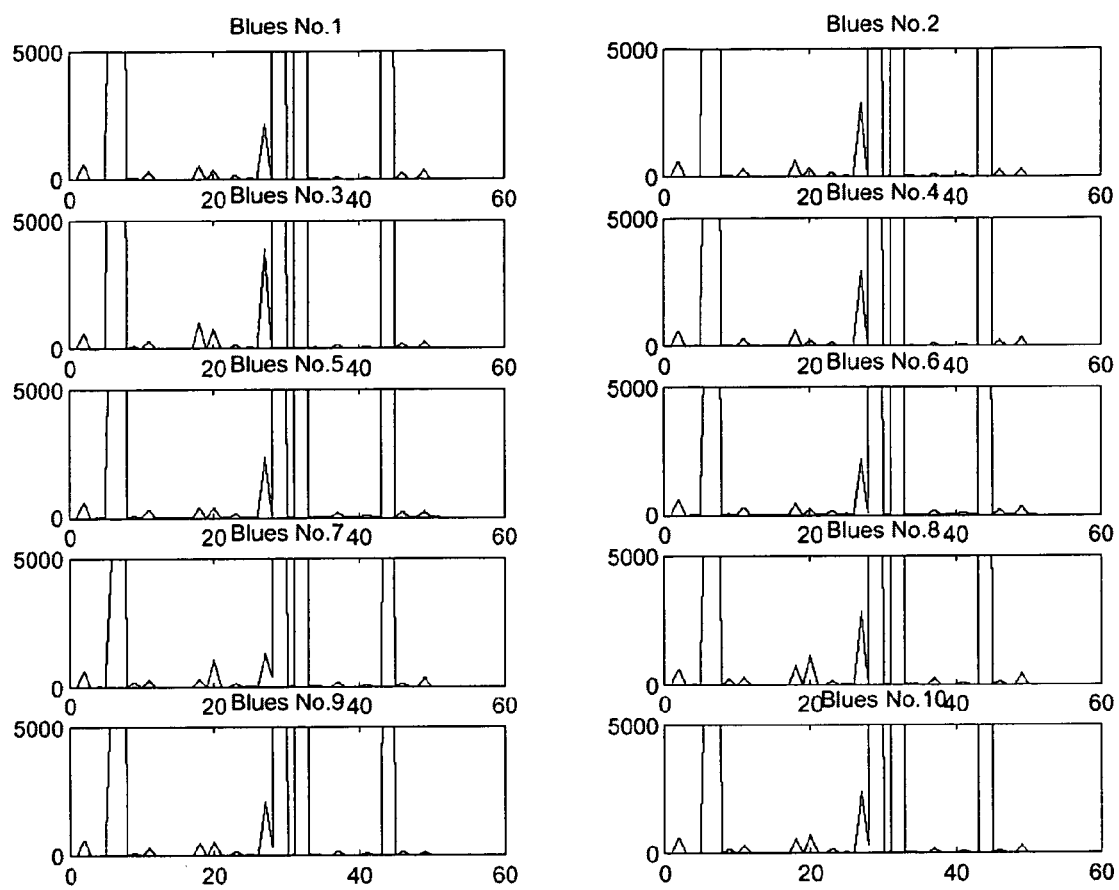
FIG. 4 is a plot of the feature sets of ten pieces of blues music.

Concrete examples will make clearer the DWCHs features and their putative advantages. In FIG. 2, from left to right and top to bottom, DWCHs features of ten music sounds drawn from the different genres of the ten-genre dataset are shown. The feature representations of different music genres show characteristics of those genres. For example, the magnitudes of Rock and Hiphop are the largest among all music genres, and Blues has the smallest DWCHs magnitude. The magnitudes are quite consistent with the impression that each musical genre makes on human listeners. FIG. 3 and FIG. 4 show DWCHs features of ten classical and ten blues music sounds taken from Dataset A, respectively. Since similar features are present inside a single music genre, a unique DWCHs feature pattern exists in each music genre, and the use of DWCHs will improve classification of music genre.

Once the feature set has been extracted, the music genre classification problem is reduced to a multi-class classification problem, which will be described with reference to FIG. 1. The problem can be formally defined as follows: The input to the problem, received in step 116, is a set of training samples of the form of $<x_i, l_i>$, where $x_i$ is a data point and $l_i$ is its label, chosen from a finite set of labels $\{c_1; c_2; \ldots ; c_k\}$. In the present case, the labels are music genres. The raw data from the musical signals in the training set is processed in the same steps 104–114 described above to produce feature sets.

The goal, represented by step 118, is to infer a function $f$ that well approximates the mapping of the x's to their labels. Once such a function $f$ is obtained, it can be used to classify music signals in step 120. Generally speaking, approaches to multi-class classification problems can be roughly divided into two groups. The first group consists of those binary classification algorithms that can be naturally extended to handle multi-class cases. This group contains such algorithm as Discriminant Analysis, K-Nearest Neighbors, regression, and decision trees including C4.5 and CART. The second group consists of methods that involve decomposition of multi-class classification problems to a collection of binary ones. Many decomposition techniques exist, including such popular methods as the one-versus-the-rest method, pairwise comparison, Error-Correcting Output Coding (ECOC), and multi-class objective functions.

The idea of the one-versus-the-rest method is as follows: to get a K-class classifier, first construct a set of binary classifiers $C_1; C_2; \ldots; C_K$. Each binary classifier is first trained to separate one class from the rest, and then the multi-class classification is carried out according to the maximal output of the binary classifiers. In pairwise comparison, a classifier is trained for each possible pair of classes. For K classes, this results in (K-1)K/2 binary classifiers. Given a new instance, the multi-class classification is then executed by evaluating all (K-1)K/2 individual classifiers and assigning the instance to the class which gets the highest number of votes. Error-Correcting Output Coding (ECOC) [6], roughly speaking, generates a number of binary classification problems by intelligently splitting the original set of classes into two sets. In other words, each class is assigned a unique binary string of length l (these strings are regarded to codewords). Then l classifiers are trained to predict each bit of the string. For new instances, the predicted class is the one whose codeword is the closest (in Hamming distance) to the codeword produced by the classifiers. One-versus-the-rest and pairwise comparison can be regarded as two special cases of ECOC with specific coding schemes. Multi-class objective functions aims to directly modify the objective function of binary SVMs in such a way that it simultaneously allows the computation of a multi-class classifier.

Figure 5:
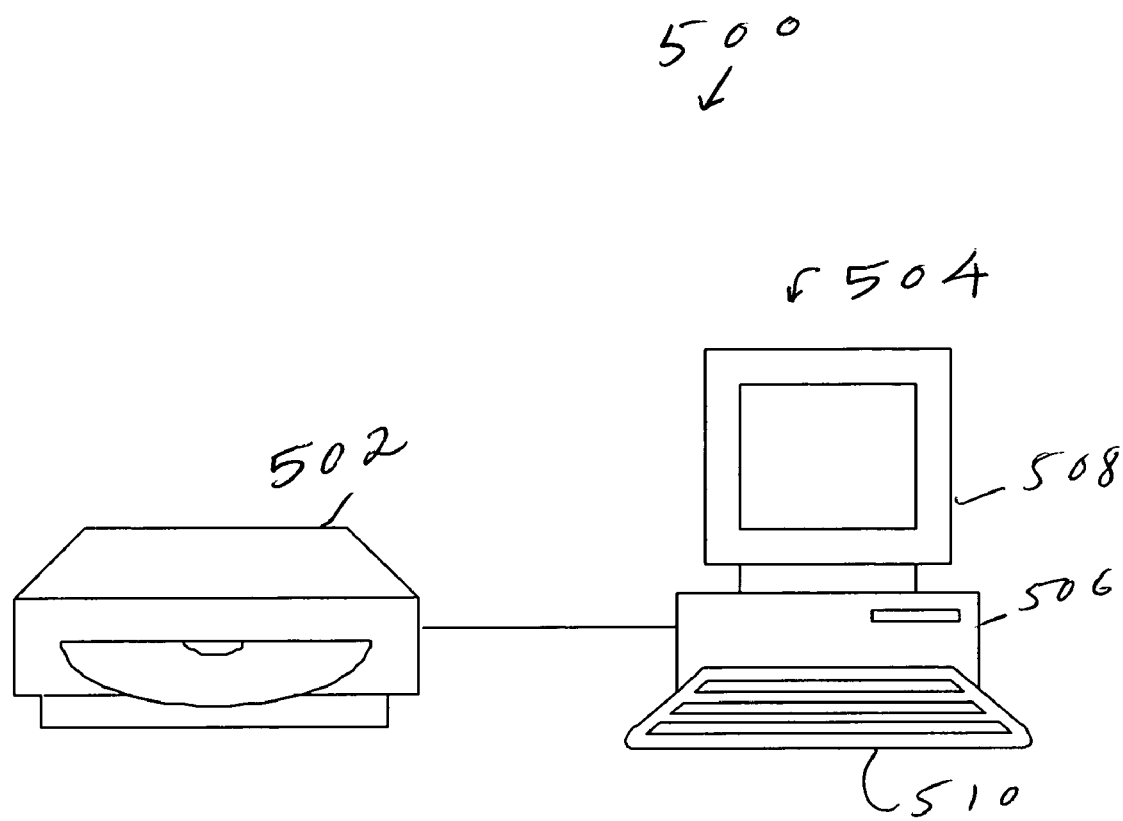
FIG. 5 is a schematic diagram of a system on which the preferred embodiment can be implemented.

An illustrative example of a system in which the present invention can be implemented is shown in FIG. 5. The system 500 includes an input 502 for supplying the music files to a computer 504. As noted above, the input 502 may or may not include persistent storage and may be local or remote. The computer 504 is sufficiently powerful to run software such as Matlab or an equivalent software package and includes a CPU 506 and such interface elements as a display 508 and a keyboard 510.

Experiments were conducted with the following additional multi-class classification approaches (see [19] for more information about the methods):

Support Vector Machines (SVMs) [30] have shown superb performance in binary classification tasks. Basically, Support Vector Machines aim at searching for a hyperplane that separates the positive data points and the negative data points with maximum margin. To extend SVMs for multi-class classification, we use one-versus-the-rest, pairwise comparison, and multi-class objective functions.

K-Nearest Neighbor (KNN) is a nonparametric classifier. It is proved that the error of KNN is asymptotically at most twice as large as the Bayesian error rate. KNN has been applied in various musical analysis problems. The basic idea is to allow a small number of neighbors to influence the decision on a point.

Gaussian Mixture Models (GMM) model the distribution of acoustics and has been widely used in music information retrieval. For each class we assume the existence of a probability density function (pdf) expressible as a mixture of a number of multidimensional Gaussian distributions. The iterative EM algorithm is then used to estimate the parameters for each Gaussian component and the mixture weight.

Linear Discriminant Analysis (LDA): In the statistical pattern recognition literature discriminant analysis approaches are known to learn discriminative feature transformations very well. The approach has been successfully used in many classification tasks [11]. The basic idea of LDA is to find a linear transformation that best discriminates among classes and performs classification in the transformed space based on some metric such as Euclidean distances. Fisher discriminant analysis finds a discriminative feature transform as eigenvectors of a matrix $$T = \sum_w^{\hat{}-1} \sum_b^{\hat{}}, \text{ where } \sum_w^{\hat{}}$$

is the intra-class covariance matrix and $$\sum_b^{\hat{}}$$

is the inter-class covariance matrix. This matrix T captures both the compactness of each class and separations between classes. So, the eigenvectors corresponding to the largest eigenvalues of T are expected to constitute a discriminative feature transform.

We used two datasets for our experiments. The first dataset, Dataset A, contains 1000 songs over ten genres with 100 songs per genre. This dataset was used in [29]. The ten genres are Blues, Classical, Country, Disco, Hiphop, Jazz, Metal, Pop, Reggae, and Rock. The excerpts of the dataset were taken from radio, compact disks, and MP3 compressed audio les. The second dataset, Dataset B, contains 756 sounds over five genres: Ambient, Classical, Fusion, Jazz, and Rock. This dataset was constructed for this paper from the CD collection of the second author. The collection of 756 sound files was created from 189 music albums as follows: From each album the first four music tracks were chosen (three tracks from albums with only three music tracks). Then from each music track the sound signals over a period of 30 seconds after the initial 30 seconds were extracted in MP3. The distribution of different genres is: Ambient (109 files), Classical (164 files), Fusion (136 files), Jazz (251 files) and Rock (96 files). For both datasets, the sound files are converted to 22050 Hz, 16-bit, mono audio files.

We used MARSYAS, a public software framework for computer audition applications, for extracting the features proposed in [29]: Mel-frequency Cepstral Coefficients (denoted by MFCCs), the timbral texture features excluding MFCCs (denoted by FFT), the rhythm content features (denoted by Beat), and the pitch contents feature (denoted by Pitch). The MFCCs feature vector consists of the mean and variance of each of the first five MFCC coefficients over the frames, the FFT feature vector consists of the mean and variance of spectral centroid, of rolloff, of flux, and of zero crossings, and of low energy; the Beat feature vector consists of six features from the rhythm histogram; the Pitch feature vector consists of five features from the pitch histograms. More information of the feature extraction can be found in [28]. Our original DWCH feature set contains four features for each of seven frequency subbands along with nineteen traditional timbral features. However, we found that not all the frequency subbands are informative, and we only use selective subbands, resulting a feature vector of length 35.

For classification methods, we use three different reduction methods to extend SVM for multi-class: pairwise, one-against-the-rest, and multi-class objective functions. For one-against-the-rest and pairwise methods, our SVM implementation was based on the LIBSVM [2], a library for support vector classification and regression. For multi-class objective functions, our implementation was based on [12]. For experiments involving SVMs, we tested them with linear, polynomial, and radius-based kernels, and the best results are reported in the tables below. For Gaussian Mixture Models, we used three Gaussian mixtures to model each music genre. For K-Nearest Neighbors, we set k=5.

Table 1 shows the accuracy of the various classification algorithms on Dataset A. The bottom four rows show how the classifiers performed on a single set of features proposed in [29]. The experiments verify the fact that each of the tradition features contains useful yet incomplete information characterizing music signals. The classification accuracy on any single feature set is significantly better than random guessing (the accuracy of random guessing on dataset A is 10%). The performance with either FFT or MFCC was significantly higher than that with Beat or Pitch in each of the methods tested. This naturally raises a question of whether FFT and MFCC are each more suitable than Beat or Pitch for music genre classification. We combined the four sets of features in every possible way to examine the accuracy. The accuracy with only Beat and Pitch is significantly smaller than the accuracy with any combination that includes either FFT or MFCC. Indeed, the accuracy with only FFT and MFCC is almost the same as that with all four for all methods. This seems to answer positively to our question.

On the other hand, the use of DWCHs further improved the accuracy on all methods. In particular, there is a significant jump in the accuracy when Support Vector Machines are used with either the pairwise or the one-versus-all approach. The accuracy of the one-versus-the-rest SVM is 78.5% on the average in the ten-fold cross validation. For some of the cross validation tests, the accuracy went beyond 80%. This is a remarkable improvement over Tsanetakis and Cook's 61%. Perrot and Gjerdigen [20] report a human study in which college students were trained to learn a music company's genre classification on a ten-genre data collection in which about 70% of accuracy is achieved. Although these results are not directly comparable due to the different dataset collections, it clear implies that the automatic content-based genre classification could possibly achieve similar accuracy as human performance. In fact, in comparison the performance of our best method seems to go far beyond that.

There are papers reporting better accuracy of automatic music genre recognition of smaller datasets. Pye [21] reports 90% on a total set of 175 songs covering six genres (Blues, Easy Listening, Classical, Opera, Dance, and Indie Rock). Soltau et al. [26] report 80% accuracy on four classes (Rock, Pop, Techno, and Classical). Just for the sake of comparison, we show in Table 2 the performance of the best classifier (DWCHs with SVM) on one-versus-all tests on each of the ten music genres in Dataset A. The performance of these classifiers are extremely good. Also, in Table 3 we show the performance of the multi-class classification for distinction among smaller numbers of classes. The accuracy gradually decreases as the number of classes increases.

TABLE 2

Genre specific accuracy of SVM1 on DWCHs.
The results are calculated via tenfold cross validation
and each entry in the table is in the form of
accuracy(standard deviation).

| Number | Genre | Accuracy |
|---|---|---|
| 1 | Blues | 95.49(1.27) |
| 2 | Classical | 98.89(1.10) |
| 3 | Country | 94.29(2.49) |

TABLE 1

Classification accuracy of the learning methods tested on Dataset A using various combinations of features. The accuracy values are calculated via ten-fold cross validation. The numbers within parentheses are standard deviations. SVM1 and SVM2 respectively denote the pairwise SVM and the one-versus-the-rest SVM.

| Features | Methods | | | | | |
|---|---|---|---|---|---|---|
| | SVM1 | SVM2 | MPSVM | GMM | LDA | KNN |
| DWCHs | 74.9(4.97) | 78.5(4.07) | 68.3(4.34) | 63.5(4.72) | 71.3(6.10) | 62.1(4.54) |
| Beat + FFT + MFCC + Pitch | 70.8(5.39) | 71.9(5.09) | 66.2(5.23) | 61.4(3.87) | 69.4(6.93) | 61.3(4.85) |
| Beat + FFT + MFCC | 71.2(4.98) | 72.1(4.68) | 64.6(4.16) | 60.8(3.25) | 70.2(6.61) | 62.3(4.03) |
| Beat + FFT + Pitch | 65.1(4.27) | 67.2(3.79) | 56.0(4.67) | 53.3(3.82) | 61.1(6.53) | 51.8(2.94) |
| Beat + MFCC + Pitch | 64.3(4.24) | 63.7(4.27) | 57.8(3.82) | 50.4(2.22) | 61.7(5.23) | 54.0(3.30) |
| FFT + MFCC + Pitch | 70.9(6.22) | 72.2(3.90) | 64.9(5.06) | 59.6(3.22) | 69.9(6.76) | 61.0(5.40) |
| Beat + FFT | 61.7(5.12) | 62.6(4.83) | 50.8(5.16) | 48.3(3.82) | 56.0(6.73) | 48.8(5.07) |
| Beat + MFCC | 60.4(3.19) | 60.2(4.84) | 53.5(4.45) | 47.7(2.24) | 59.6(4.03) | 50.5(4.53) |
| Beat + Pitch | 42.7(5.37) | 41.1(4.68) | 35.6(4.27) | 34.0(2.69) | 36.9(4.38) | 35.7(3.59) |
| FFT + MFCC | 70.5(5.98) | 71.8(4.83) | 63.6(4.71) | 59.1(3.20) | 66.8(6.77) | 61.2(7.12) |
| FFT + Pitch | 64.0(5.16) | 68.2(3.79) | 55.1(5.82) | 53.7(3.15) | 60.0(6.68) | 53.8(4.73) |
| MFCC + Pitch | 60.6(4.54) | 64.4(4.37) | 53.3(2.95) | 48.2(2.71) | 59.4(4.50) | 54.7(3.50) |
| Beat | 26.5(3.30) | 21.5(2.71) | 22.1(3.04) | 22.1(1.91) | 24.9(2.99) | 22.8(5.12) |
| FFT | 61.2(6.74) | 61.8(3.39) | 50.6(5.76) | 47.9(4.91) | 56.5(6.90) | 52.6(3.81) |
| MFCC | 58.4(3.31) | 58.1(4.72) | 49.4(2.27) | 46.4(3.09) | 55.5(3.57) | 53.7(4.11) |
| Pitch | 36.6(2.95) | 33.6(3.23) | 29.9(3.76) | 25.8(3.02) | 30.7(2.79) | 33.3(3.20) |

TABLE 2-continued

Genre specific accuracy of SVM1 on DWCHs.
The results are calculated via tenfold cross validation
and each entry in the table is in the form of
accuracy(standard deviation).

| Number | Genre | Accuracy |
|---|---|---|
| 4 | Disco | 92.69(2.54) |
| 5 | Jazz | 97.90(0.99) |
| 6 | Metal | 95.29(2.18) |
| 7 | Pop | 95.80(1.69) |
| 8 | Hiphop | 96.49(1.28) |
| 9 | Reggae | 92.30(2.49) |
| 10 | Rock | 91.29(2.96) |

TABLE 3

Accuracy on various subsets of Dataset A using DWCHs. The class numbers correspond
to those of Table 2. The accuracy values are calculated via ten-fold cross validation.
The numbers in the parentheses are the standard deviations.

| | Methods | | | | | |
|---|---|---|---|---|---|---|
| Classes | SVM1 | SVM2 | MPSVM | GMM | LDA | KNN |
| 1 & 2 | 98.00(3.50) | 98.00(2.58) | 99.00(2.11) | 98.00(3.22) | 99.00(2.11) | 97.5(2.64) |
| 1, 2 & 3 | 92.33(5.46) | 92.67(4.92) | 93.33(3.51) | 91.33(3.91) | 94.00(4.10) | 87.00(5.54) |
| 1 through 4 | 90.5(4.53) | 90.00(4.25) | 89.75(3.99) | 85.25(5.20) | 89.25(3.92) | 83.75(5.92) |
| 1 through 5 | 88.00(3.89) | 86.80(4.54) | 83.40(5.42) | 81.2(4.92) | 86.2(5.03) | 78.00(5.89) |
| 1 through 6 | 84.83(4.81) | 86.67(5.27) | 81.0(6.05) | 73.83(5.78) | 82.83(6.37) | 73.5(6.01) |
| 1 through 7 | 83.86(4.26) | 84.43(3.53) | 78.85(3.67) | 74.29(6.90) | 81.00(5.87) | 73.29(5.88) |
| 1 through 8 | 81.5(4.56) | 83.00(3.64) | 75.13(4.84) | 72.38(6.22) | 79.13(6.07) | 69.38(5.47) |
| 1 through 9 | 78.11(4.83) | 79.78(2.76) | 70.55(4.30) | 68.22(7.26) | 74.47(6.22) | 65.56(4.66) |

Table 4 presents the results on our own dataset. This dataset was generated with little control by blindly taking 30 seconds after introductory 30 seconds of each music and covers many different albums, so the performance was anticipated to be lower than that for Database A. Also, there is the genre of Ambient, which covers music bridging between Classical and Jazz. The difficulty in classifying such borderline cases is compensated for the reduction in the number of classes. The overall performance was only 4 to 5% lower than that for Database A.

TABLE 4

Classification accuracy of the learning methods tested on Dataset B using
various combinations of features calculated via tenfold cross validation.
The numbers within parentheses are standard deviations.

| | Methods | | | | | |
|---|---|---|---|---|---|---|
| Features | SVM1 | SVM2 | MPSVM | GMM | LDA | KNN |
| DWCHs | 71.48(6.84) | 74.21(4.65) | 67.16(5.60) | 64.77(6.15) | 65.74(6.03) | 61.84(4.88) |
| Beat + FFT + MFCC + Pitch | 68.65(3.90) | 69.19(4.32) | 65.21(3.63) | 63.08(5.89) | 66.00(5.57) | 60.59(5.43) |
| FFT + MFCC | 66.67(4.40) | 70.63(4.13) | 64.29(4.54) | 61.24(6.29) | 65.35(4.86) | 60.78(4.30) |
| Beat | 43.37(3.88) | 44.52(4.14) | 41.01(4.46) | 37.95(5.21) | 40.87(4.50) | 41.27(2.96) |
| FFT | 61.65(5.57) | 62.19(5.26) | 54.76(2.94) | 50.80(4.89) | 57.94(5.11) | 57.42(5.64) |
| MFCC | 60.45(5.12) | 67.46(3.57) | 57.42(4.67) | 53.43(5.64) | 59.26(4.77) | 59.93(3.49) |
| Pitch | 37.56(4.63) | 39.37(3.88) | 36.49(5.12) | 29.62(5.89) | 37.82(4.67) | 38.89(5.04) |

We observe that SVMs are always the best classifiers for content-based music genre classification. However, the choice of the reduction method from multi-class to binary seems to be problem-dependent and there is no clear overall winner. It is fair to say that there is probably no reduction method generally outperforms the others. Feature extraction is crucial for music genre classification. The choice of features is more important than the choice of classifiers. The variations of classification accuracy on different classification techniques are much smaller than those of different feature extraction techniques.

The technique disclosed above is not limited in applicability to classifying music into genres such as classical and blues. It can be expanded to the classification of music in accordance with the emotions that it provokes in listeners, e.g., cheerful, dreamy. Of course, like the genres discussed above, a piece of music may fall into more than one emotional category.

While a preferred embodiment of the present invention has been set forth above, those skilled in the art who have reviewed the present disclosure will readily appreciate that other embodiments can be realized within the scope of the present invention. For example, more or fewer than ten genres of music can be used. Also, the present invention is not limited to the use of Matlab; instead, any other suitable software can be used. Therefore, the present invention should be construed as limited only by the appended claims.

We claim:

1. A method for automatically forming a feature set describing an electronic signal representing a piece of music, the method comprising:

(a) receiving the electronic signal into a computing device;
(b) performing a wavelet decomposition of the electronic signal to obtain a plurality of wavelet coefficients in a plurality of subbands;
(c) forming a histogram of the wavelet coefficients in each of the subbands;
(d) calculating an average, variance and skewness of each of the histograms;
(e) calculating a subband energy of each of the histograms; and
(f) forming the feature set such that the feature set comprises the average, variance, skewness, and subband energy of at least some of the subbands, wherein step (f) comprises forming the feature set such that the feature set comprises the average, variance, skewness, and subband energy of fewer than all of the subbands.

2. The method of claim 1, further comprising extracting timbral features from the electronic signal, and wherein the feature set further comprises the timbral features.

3. A method for automatically forming a feature set describing an electronic signal representing a piece of music, the method comprising:
(a) receiving the electronic signal into a computing device;
(b) performing a wavelet decomposition of the electronic signal to obtain a plurality of wavelet coefficients in a plurality of subbands;
(c) forming a histogram of the wavelet coefficients in each of the subbands;
(d) calculating an average, variance and skewness of each of the histograms;
(e) calculating a subband energy of each of the histograms; and
(f) forming the feature set such that the feature set comprises the average, variance, skewness, and subband energy of at least some of the subbands;
wherein step (b) comprises convolving at least part of the electronic signal with a Daubechies wavelet filter, and wherein step (b) is performed with less than all of the electronic signal.

4. A method for automatically forming a feature set describing an electronic signal representing a piece of music, the method comprising:
(a) receiving the electronic signal into a computing device;
(b) performing a wavelet decomposition of the electronic signal to obtain a plurality of wavelet coefficients in a plurality of subbands;
(c) forming a histogram of the wavelet coefficients in each of the subbands;
(d) calculating an average, variance and skewness of each of the histograms;
(e) calculating a subband energy of each of the histograms;
(f) forming the feature set such that the feature set comprises the average, variance, skewness, and subband energy of at least some of the subbands; and
(g) using the feature set to classify the piece of music into at least one of a plurality of categories of music, wherein step (g) is performed using a multi-class classification algorithm, and wherein step (g) is performed using a plurality of binary classification algorithms.

5. The method of claim 4, wherein the binary classification algorithms comprise support vector machine classification algorithms.

6. A method for automatically forming a classifier algorithm for classifying a piece of music represented by an electronic signal into one or more of a plurality of musical genres, the method comprising:
(a) receiving into a computing device a plurality of classified electronic signals, each of the classified electronic signals representing a known piece of music which has already been classified into one or more of the plurality of musical genres;
(b) for each of the classified electronic signals:
(i) performing a wavelet decomposition of the classified electronic signal to obtain a plurality of wavelet coefficients in a plurality of subbands;
(ii) forming a histogram of the wavelet coefficients in each of the subbands;
(iii) calculating an average, variance and skewness of each of the histograms;
(iv) calculating a subband energy of each of the histograms; and
(v) forming a feature set such that the feature set comprises the average, variance, skewness, and subband energy of at least some of the subbands; and
(c) automatically forming the classifier algorithm from the feature sets such that the classifier algorithm properly classifies the known pieces of music.

7. The method of claim 6, wherein step (b)(v) comprises forming each feature set such that the feature set comprises the average, variance, skewness, and subband energy of fewer than all of the subbands.

8. The method of claim 7, further comprising extracting timbral features from each classified electronic signal, and wherein each feature set further comprises the timbral features.

9. The method of claim 6, wherein step (b)(i) comprises convolving at least part of the classified electronic signal with a Daubechies wavelet filter.

10. The method of claim 9, wherein step (b)(i) is performed with less than all of the electronic signal.

11. The method of claim 6, wherein the classifier algorithm comprises a multi-class classification algorithm.

12. The method of claim 11, wherein the classifier algorithm comprises a plurality of binary classification algorithms.

13. The method of claim 12, wherein the binary classification algorithms comprise support vector machine classification algorithms.

14. A device for automatically forming a feature set describing an electronic signal representing a piece of music, the device comprising:
an input for receiving the electronic signal; and
a computing device, in communication with the input, for:
performing a wavelet decomposition of the electronic signal to obtain a plurality of wavelet coefficients in a plurality of subbands;
forming a histogram of the wavelet coefficients in each of the subbands;
calculating an average, variance and skewness of each of the histograms;
calculating a subband energy of each of the histograms; and
forming the feature set such that the feature set comprises the average, variance, skewness, and subband energy of at least some of the subbands, wherein the computing device forms the feature set such that the feature set comprises the average, variance, skewness, and subband energy of fewer than all of the subbands.

15. The device of claim 14, wherein the computing device also extracts timbral features from the electronic signal, and wherein the feature set further comprises the timbral features.

16. A device for automatically forming a feature set describing an electronic signal representing a piece of music, the device comprising:
   an input for receiving the electronic signal; and
   a computing device, in communication with the input, for:
   performing a wavelet decomposition of the electronic signal to obtain a plurality of wavelet coefficients in a plurality of subbands;
   forming a histogram of the wavelet coefficients in each of the subbands;
   calculating an average, variance and skewness of each of the histograms;
   calculating a subband energy of each of the histograms; and
   forming the feature set such that the feature set comprises the average, variance, skewness, and subband energy of at least some of the subbands;
   wherein the computing device performs the wavelet decomposition by convolving at least part of the electronic signal with a Daubechies wavelet filter, and wherein the wavelet decomposition is performed with less than all of the electronic signal.

17. A device for automatically forming a feature set describing an electronic signal representing a piece of music, the device comprising:
   an input for receiving the electronic signal; and
   a computing device, in communication with the input, for:
   performing a wavelet decomposition of the electronic signal to obtain a plurality of wavelet coefficients in a plurality of subbands;
   forming a histogram of the wavelet coefficients in each of the subbands;
   calculating an average, variance and skewness of each of the histograms;
   calculating a subband energy of each of the histograms;
   forming the feature set such that the feature set comprises the average, variance, skewness, and subband energy of at least some of the subbands; and
   using the feature set to classify the piece of music into at least one of a plurality of categories of music, wherein the computing device classifies the piece of music using a multi-class classification algorithm, and wherein the computing device classifies the piece of music using a plurality of binary classification algorithms.

18. The device of claim 17, wherein the binary classification algorithms comprise support vector machine classification algorithms.

19. A device for automatically forming a classifier algorithm for classifying a piece of music represented by an electronic signal into one or more of a plurality of musical genres, the device comprising;
   an input for receiving a plurality of classified electronic signals, each of the classified electronic signals representing a known piece of music which has already been classified into one or more of the plurality of musical genres; and
   a computing device, in communication with the input for forming the classifier algorithm by:
   for each of the classified electronic signals;
      (i) performing a wavelet decomposition of the classified electronic signal to obtain a plurality of wavelet coefficients in a plurality of subbands;
      (ii) forming a histogram of the wavelet coefficients in each of the subbands;
      (iii) calculating an average, variance and skewness of each of the histograms;
      (iv) calculating a subband energy of each of the histograms; and
      (v) forming a feature set such that the feature set comprises the average, variance, skewness, and subband energy of at least some of the subbands; and
   automatically forming the classifier algorithm from the feature sets such that the classifier algorithm properly classifies the known pieces of music.

20. The device of claim 19, wherein the computing device forms each feature set such that the feature set comprises the average, variance, skewness, and subband energy of fewer than all of the subbands.

21. The device of claim 20, wherein the computing device extracts timbral features from each classified electronic signal, and wherein each feature set further comprises the timbral features.

22. The device of claim 19, wherein the computing device performs the wavelet decomposition by convolving at least part of the classified electronic signal with a Daubechies wavelet filter.

23. The device of claim 22, wherein the wavelet decomposition is performed with less than all of the electronic signal.

24. The device of claim 19, wherein the classifier algorithm comprises a multi-class classification algorithm.

25. The device of claim 24, wherein the classifier algorithm comprises a plurality of binary classification algorithms.

26. The device of claim 24, wherein the binary classification algorithms comprise support vector machine classification algorithms.

* * * * *